C. E. WILSON.
ADJUSTING DEVICE FOR BEARINGS AND PROCESS OF MANUFACTURING THE SAME.
APPLICATION FILED MAY 11, 1914.
1,229,693.
Patented June 12, 1917.
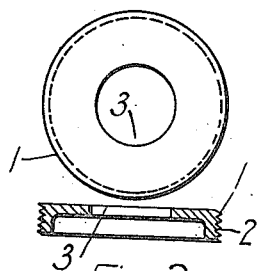
Fig. 1.
Fig. 2.
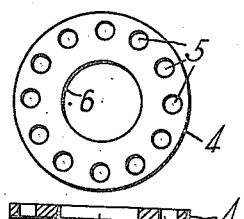
Fig. 3.
Fig. 4.
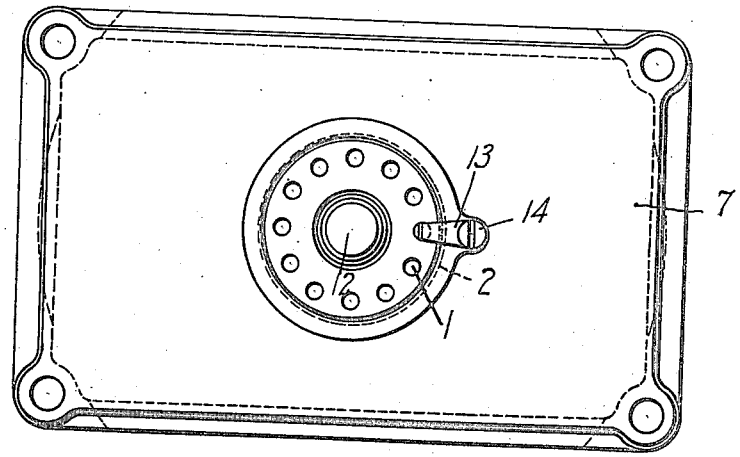
Fig. 5.
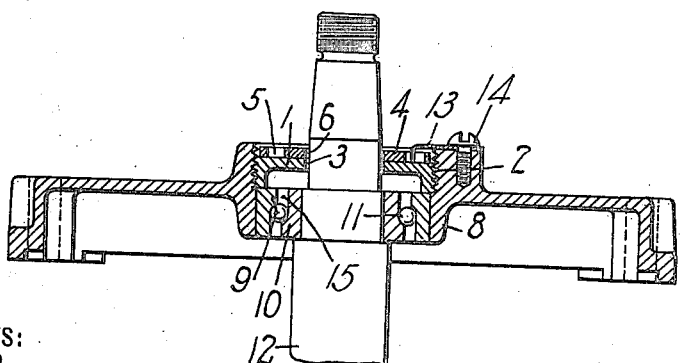
Fig. 6.
WITNESSES:
P. J. Rodger.
J. R. Langley.
INVENTOR
Charles E. Wilson.
BY
Wesley E. Carr
ATTORNEY

UNITED STATES PATENT OFFICE.

CHARLES E. WILSON, OF WILKINSBURG, PENNSYLVANIA, ASSIGNOR TO WESTINGHOUSE ELECTRIC AND MANUFACTURING COMPANY, A CORPORATION OF PENNSYLVANIA.

ADJUSTING DEVICE FOR BEARINGS AND PROCESS OF MANUFACTURING THE SAME.

1,229,693.     Specification of Letters Patent.     Patented June 12, 1917.

Application filed May 11, 1914. Serial No. 837,799.

*To all whom it may concern:*

Be it known that I, CHARLES E. WILSON, a citizen of the United States, and a resident of Wilkinsburg, in the county of Allegheny and State of Pennsylvania, have invented a new and useful Improvement in Adjusting Devices for Bearings and Processes of Manufacturing the Same, of which the following is a specification.

My invention relates to adjusting devices for bearings and processes of manufacturing the same, and it has particular reference to such devices as may be employed in connection with ball bearings.

My invention has for its object to provide a device of the character indicated above that is simple in construction, economical in manufacture and efficient in operation to adjust the relative positions of the cones of ball bearings.

In the manufacture of devices of the same general character as that of my invention, it has been the usual practice to form them by suitable machine tools and then provide them with a number of perforations by drilling. This process is comparatively expensive because of the amount of labor involved.

I provide a device in which a threaded portion and a perforated portion are separately formed by punching and are then spot-welded together to form a unitary structure. By means of this process, the labor involved in construction is materially decreased and the cost of manufacture is correspondingly reduced.

In the accompanying drawings, Figure 1 is an end view, in elevation, of an adjusting nut constructed in accordance with my invention. Fig. 2 is a sectional view of the device shown in Fig. 1. Fig. 3 is an end view, in elevation, of an adjusting plate. Fig. 4 is a sectional view of the plate shown in Fig. 3. Fig. 5 is an end view, in elevation, of the end plate of a dynamo-electric machine with my invention attached thereto. Fig. 6 is a sectional view of the mechanism shown in Fig. 5.

An adjusting device constructed in accordance with my invention comprises an adjusting nut 1 having a threaded flange portion 2 and a central circular opening 3. The adjusting device also comprises an adjusting plate 4 provided with a number of circular openings 5 that are substantially equidistant from each other and from the axis of the plate. The plate 4 is also provided with a central circular opening 6 of a diameter equal to that of the opening 3 in the nut 1. The nut 1 and the plate 4 are formed by punching and are then brought together in the relative positions shown in Fig. 6 and are spot-welded by any suitable electrical welding mechanism to form a unitary structure.

Referring now to Figs. 5 and 6, an end plate 7 of a dynamo-electric machine or similar machine is provided with a flange portion 8 to receive a ball bearing 15 which comprises cones 9 and 10 and bearing balls 11. The adjusting nut 1 has a threaded engagement with the flange 8 and normally presses against the cone 9 to adjust the relative positions, in an axial direction, of the cones 9 and 10, the position of the cone 10 being determined by the shaft 12 upon which it is fixed. The adjusting nut 1 is held in its adjusted position by a spring clip 13 which coacts with one of the several holes or recesses 5. The clip 13 is normally held in position to prevent rotation of the nut 1 by a screw 14. When it is desired to adjust the position of the nut 1, the screw 14 is removed a sufficient distance to permit the removal of the spring clip 13 from the hole 5. The nut 1 may then be rotated by means of any suitable tool (not shown) and again secured in position by the clip 13 and the screw 14.

The advantages of my invention will be readily understood by those skilled in the art since it is well known that the process of punching devices of the same general character as that of my invention may be accomplished more quickly and, therefore, they may be produced more cheaply than by constructing the same by the use of machine tools.

Many changes may occur to those skilled in the art to which my invention appertains, and it is understood that such modifications may be made, without departing from the spirit of my invention, as fall within the limits of the appended claims.

I claim as my invention:

1. In an adjusting device, the combination with a disk provided with a threaded portion, of a perforated plate member attached thereto.

2. In an adjusting device, the combination with a disk having a screw-threaded portion, of a recessed plate member welded to said disk.

3. In an adjusting device, the combination with a disk having a screw-threaded flange integral therewith, of a recessed plate member welded to said disk.

4. In an adjusting device, the combination with a disk having a peripheral screw-threaded portion, of a recessed plate member spot welded to said disk.

5. The process of manufacturing an adjusting device which consists in forming a threaded member by punching, forming a recessed member by punching, and then welding said members together.

6. The process of manufacturing an adjusting device which consists in punching a disk having a threaded flange portion, punching a perforated plate member, and then spot welding said plate member to said disk.

In testimony whereof, I have hereunto subscribed my name this 28th day of April, 1914.

CHARLES E. WILSON.

Witnesses:
F. H. PATTEN,
B. B. HINES.